(12) United States Patent
Kerns et al.

(10) Patent No.: US 12,146,739 B2
(45) Date of Patent: Nov. 19, 2024

(54) ANGLE MEASUREMENT DEVICE WITH ATTACHMENT TO PIPE, CONDUIT OR CYLINDRICAL WORKPIECE

(71) Applicant: Emerson Professional Tools, LLC, Elyria, OH (US)

(72) Inventors: Joshua Curtis Kerns, Rockford, IL (US); Billy Odon M. Yrad, Jr., Amherst, OH (US)

(73) Assignee: Emerson Professional Tools, LLC, Elyria, OH (US)

( * ) Notice: Subject to any disclaimer, the term of this patent is extended or adjusted under 35 U.S.C. 154(b) by 392 days.

(21) Appl. No.: 17/648,467

(22) Filed: Jan. 20, 2022

(65) Prior Publication Data

US 2023/0228552 A1 Jul. 20, 2023

(51) Int. Cl.
*G01B 7/30* (2006.01)
*G01B 5/24* (2006.01)

(52) U.S. Cl.
CPC . *G01B 7/30* (2013.01); *G01B 5/24* (2013.01)

(58) Field of Classification Search
CPC .. G01B 7/30; G01B 21/22; B21D 7/14; B25B 11/00
See application file for complete search history.

(56) References Cited

U.S. PATENT DOCUMENTS

| | | |
|---|---|---|
| 3,060,587 A | 10/1962 | Picken |
| 3,949,584 A | 4/1976 | Pearson et al. |
| 4,394,799 A | 7/1983 | Moree et al. |
| 5,050,089 A | 9/1991 | Stelson et al. |
| 5,144,823 A | 9/1992 | Wood |
| 5,167,075 A | 12/1992 | Weldy et al. |
| 5,275,031 A | 1/1994 | Whiteside et al. |
| 5,290,166 A | 3/1994 | Heatherly |
| 5,531,031 A | 7/1996 | Green |
| 5,669,258 A | 9/1997 | Luebke |
| 6,253,595 B1 | 7/2001 | Lewis, Jr. |
| 6,385,856 B1 | 5/2002 | Godin |
| 6,980,880 B1 * | 12/2005 | Ramsey ............ B21D 7/14 700/165 |
| 8,661,701 B2 | 3/2014 | Wixey et al. |

(Continued)

FOREIGN PATENT DOCUMENTS

| | | |
|---|---|---|
| DE | 102011006101 A1 | 9/2012 |
| DE | 102011006101 B4 | 9/2012 |
| WO | WO2018202612 A1 | 11/2018 |

OTHER PUBLICATIONS

Kapro 393 DIGI PRO; https://kapro.com/wp-content/uploads/2019/03/393-DIGI-PRO -.pdf, 2018.

(Continued)

*Primary Examiner* — Eman A Alkafawi
*Assistant Examiner* — Dilara Sultana
(74) *Attorney, Agent, or Firm* — Klintworth & Rozenblat IP LLP

(57) ABSTRACT

An angle measurement device is provided positioning electronic components on a cylindrical workpiece. The device includes upper and lower housings which are pivotally (Continued)

coupled together, and spaced apart magnetic elements mounted to an upper surface of the upper housing, and a biasing member coupled to the housings. The biasing member is configured to bias the housings into a closed position.

21 Claims, 15 Drawing Sheets

(56) References Cited

U.S. PATENT DOCUMENTS

| | | | |
|---|---|---|---|
| 9,283,605 | B2 | 3/2016 | Plummer et al. |
| 9,375,773 | B2 | 6/2016 | Plummer et al. |
| 9,663,304 | B2 | 5/2017 | Mantell et al. |
| 9,849,494 | B2 | 12/2017 | Plummer et al. |
| 10,011,007 | B2 | 7/2018 | Velez |
| 10,012,346 | B2 | 7/2018 | Killion et al. |
| 10,217,237 | B1 | 2/2019 | Goncharov et al. |
| 10,478,881 | B2 | 11/2019 | Plummer et al. |
| 10,569,320 | B2 | 2/2020 | Nobles |
| 2003/0126725 | A1* | 7/2003 | Housley .............. A47G 25/485 223/96 |
| 2009/0178453 | A1 | 7/2009 | Ghiran et al. |
| 2013/0319061 | A1 | 12/2013 | Tofini |
| 2015/0135793 | A1 | 5/2015 | Plummer et al. |
| 2015/0139774 | A1* | 5/2015 | Mantell .............. B23B 31/1261 414/816 |
| 2016/0040973 | A1* | 2/2016 | Gesuita ................ G01B 5/24 33/534 |
| 2016/0325940 | A1 | 11/2016 | Rimmington |
| 2016/0354823 | A1 | 12/2016 | Nozu et al. |
| 2017/0095849 | A1 | 4/2017 | Nobles |
| 2017/0095850 | A1 | 4/2017 | McNurlin et al. |
| 2020/0070230 | A1 | 3/2020 | Plummer et al. |
| 2021/0063134 | A1 | 3/2021 | Scioscia, Jr. |
| 2021/0069766 | A1* | 3/2021 | Sweeney .............. B21D 7/14 |
| 2021/0276064 | A1* | 9/2021 | Fiorentini .............. B21D 7/12 |

OTHER PUBLICATIONS

Klein 935 Digital Angle Gauge and Level; https://www.kleintools.com/catalog/level-measuring-tools/digital-angle-gauge-and-level, Sep. 2019.

Sumner* Universal Center Punch; https://www.sumner.com/sumner/sub/productb/main.322.7.11.322.0.0.html, Mar. 25, 2012.

https://www.magnet4sale.com/8-sets-of-strong-neodymium-channel-magnets-w-countersunk-holes-45-lb-holding-power-each-matching-screws-included/, Dec. 21, 2017.

"Instruction Manual, Greenlee, 855GX IntelliBENDER® Electric Bender," 2019.

Machine translation of DE102011006101.

Machine translation of WO2018202612.

Active Angle Control (0:18 sec, 0:23 sec, 0:30 sec, 0:34 sec, 0:35 sec, 0:36 sec, 0:40 sec, 0:42 sec, 0:45 sec, 0:51 sec, 0:53 sec, 0:58 sec, 0:59 sec, 1:00 min, 1:01 min, 1:02 min), Youtube.com, https://youtu.be/AMfEc-DsLt4?t=22 Dec. 08, 2016, 16 pages.

"Instruction Manual 854DX Electric Bender," Greenlee Textron, Inc., Rockford IL, USA, 2015, 32 pages.

"Instruction Manual 881 and 881CT Cam Track Hydraulic Benders and 1813 Bending Table," Greenlee Textron, Inc., Rockford IL, USA, 2011, 104 pages.

\* cited by examiner

ANGLE MEASUREMENT DEVICE WITH ATTACHMENT TO PIPE, CONDUIT OR CYLINDRICAL WORKPIECE

FIELD OF THE DISCLOSURE

The present disclosure generally relates to an angle measurement device having an attachment to a pipe, to a conduit, or to a cylindrical workpiece.

BACKGROUND

In order for the operator to bend a workpiece to a desired angle, the operator must know certain characteristics of the workpiece and utilizing the above criteria, the operator determines the necessary bending operation to achieve the target bend angle in the workpiece.

A mechanical or electrical application of installing pipe, conduit, or cylindrical workpieces typically requires bending the pipe, conduit, or cylindrical workpiece to suit installing around existing geometry. The pipe, conduit, or cylindrical workpiece is bent using any number of different available bending machines. The pipe, conduit, or cylindrical workpiece is bent to a precise angle required by the installation geometry. These angles are measured during and/or after the bend.

United States Publication No. US-2021-0276064-A1 discloses a bender configured to bend a pipe, conduit, or cylindrical workpiece in a bending operation and its method of use. The bender includes a springback assembly having a pair of sensors which are in communication with a control system. Each sensor may be an inertial measurement unit, for example an accelerometer or a gyroscope. In use, a pipe, conduit, or cylindrical workpiece is inserted within a groove of a bending shoe and is gripped by a gripping member. The sensors are positioned at both ends of the pipe, conduit, or cylindrical workpiece or to components that rotate with either end of the pipe, conduit, or cylindrical workpiece. There is a need to mate the sensors accurately in line with a line parallel to the centerline of the pipe, conduit, or cylindrical workpiece at the installed location.

SUMMARY

In an aspect of the disclosure, an angle measurement device is provided positioning electronic components on a cylindrical workpiece. The device includes upper and lower housings which are pivotally coupled together, and spaced apart magnetic elements mounted to an upper surface of the upper housing, and a biasing member coupled to the housings. The biasing member is configured to bias the housings into a closed position.

In an aspect of the disclosure, an angle measurement device is provided for positioning electronic components on a cylindrical workpiece. The angle measurement device includes upper and lower housings which are pivotally coupled together. An upper surface of the lower housing has a central surface section, a first surface section extending from the central surface section to a side surface of the lower housing, the first surface section having a different profile than the central surface section, and a second surface section extending from the central surface section to an opposite side surface of the lower housing, the second surface section having a different profile than the central surface section. The central surface section has a constant radius. The lower surface of the upper housing faces the upper surface of the lower housing, and has a central surface section, a first surface section extending from the central surface section of the upper housing to a side surface of the upper housing, the first surface section of the upper housing having a different profile than the central surface section of the upper housing, and a second surface section extending from the central surface section to an opposite side surface of the upper housing. The central surface section of the upper housing has a constant radius. The second surface section of the upper housing has a different profile than the central surface section of the upper housing.

DETAILED DESCRIPTION

Figure 1:
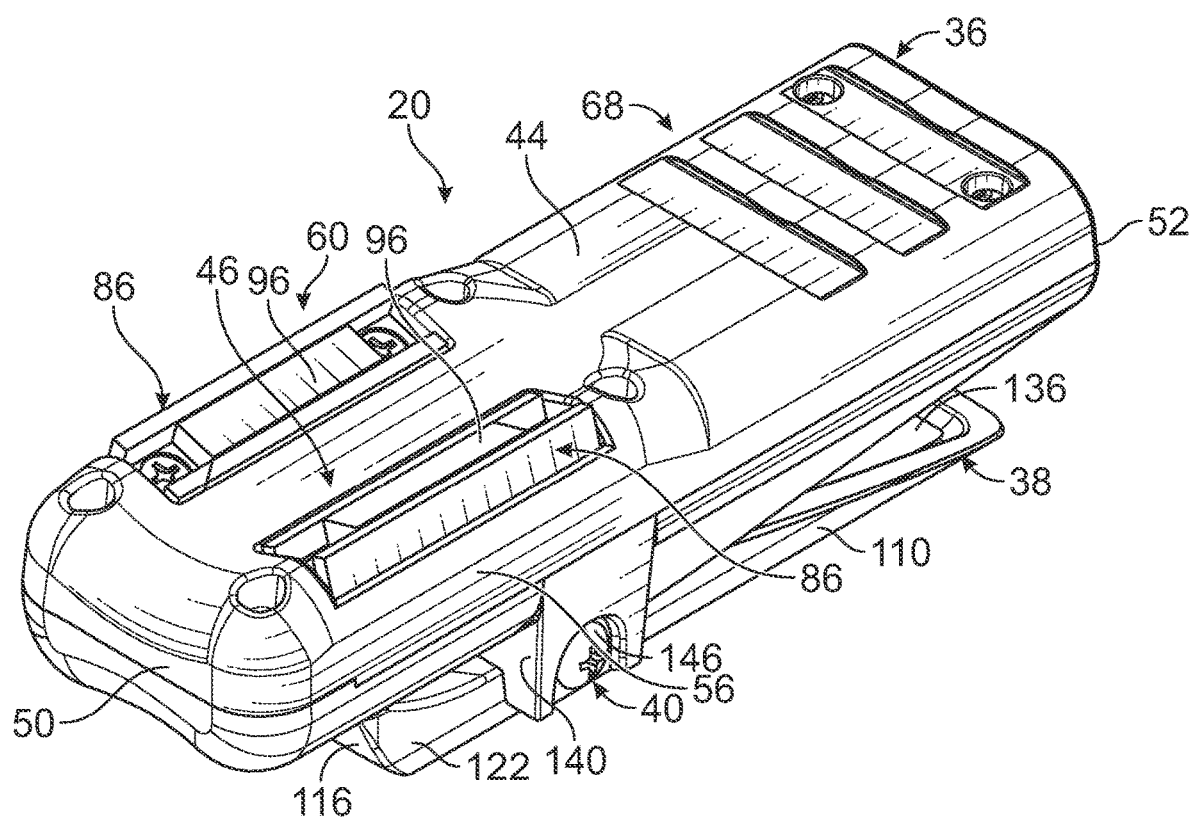
FIG. 1 depicts a perspective view of an angle measurement device which incorporates features of the present disclosure.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 1A:
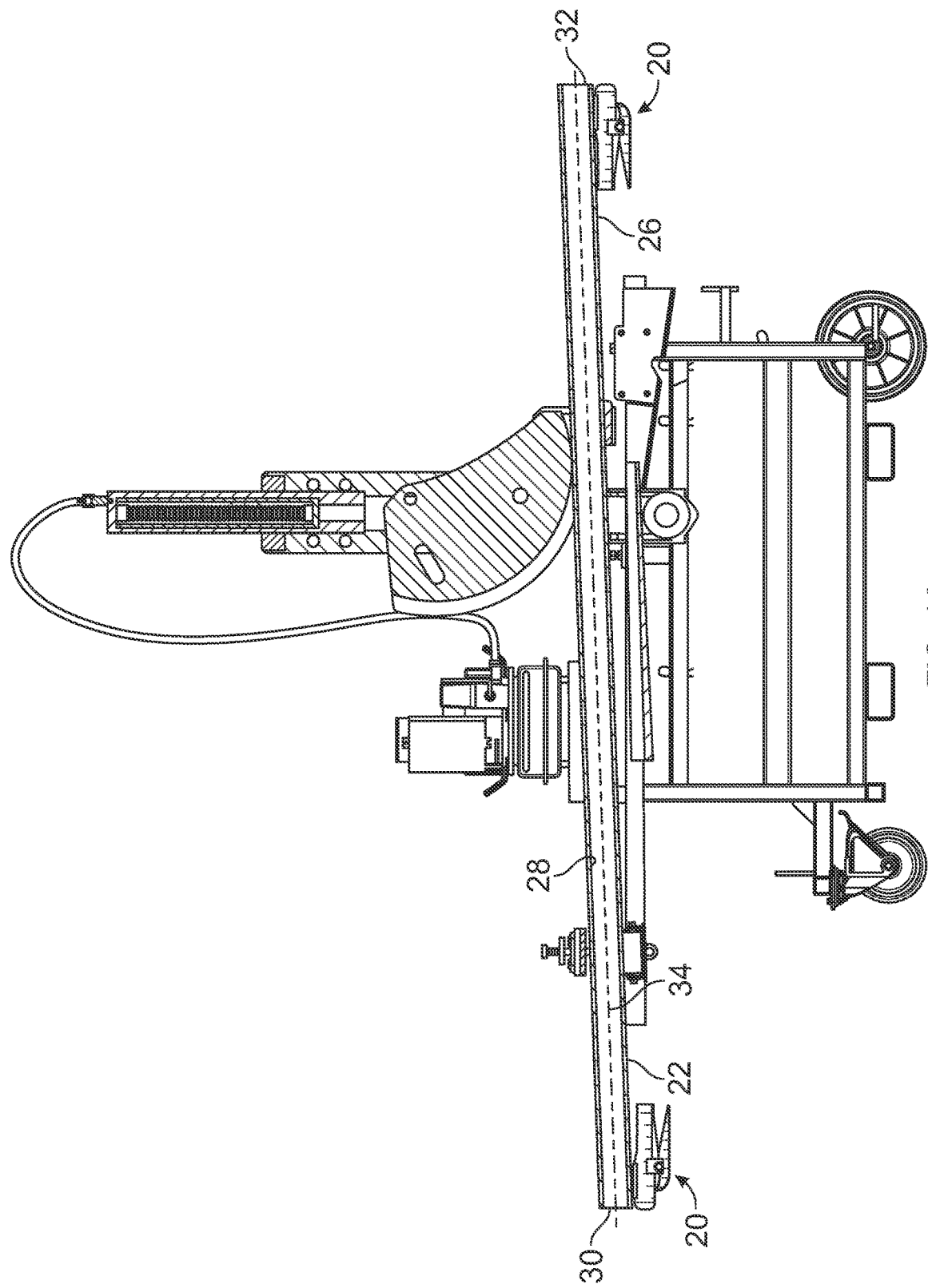
FIG. 1A depicts a cross-sectional view of the bender and a workpiece mounted therein prior to a bending operation, the angle measurement device being mounted on the workpiece.

An angle measurement device 20, see FIG. 1, is disclosed for attachment to a pipe, a conduit, or a cylindrical workpiece (herein "workpiece 22"). The angle measurement device 20 can be used to position electronic components 180, such as a digital, multi-axis protractor/angle gauge or a sensor, on the workpiece 22. The workpiece 22 has an outer cylindrical surface 26 and a central passageway defined by an inner cylindrical surface 28. The passageway defined by the inner cylindrical surface 28 extends between opposite ends 30, 32 of the workpiece 22. A centerline 34 of the workpiece 22 is defined between the ends 30, 32. The angle measurement device 20 can be used to position the electronic components 180 proximate to one of the ends 30, 32 or to components that rotate with either end 30, 32 of the workpiece 22 for spring-back compensation. An example of an installation in which the angle measurement device 20 is suitable for use for spring-back compensation is disclosed in United States Publication No. US-2021-0276064-A1 and is shown in FIG. 1A. The angle measurement device 20 accurately mates the electronic components 180 accurately in line with a line parallel to the centerline 34 of the workpiece 22.

The angle measurement device 20 can be attached to the workpiece 22 in a variety of positions and can be attached to a workpieces 22 of varying diameters. For example, the angle measurement device 20 can be attached to sizes of workpieces 22 having 2.5" diameter, shown in FIGS. 14-17, through 4" diameter, shown in FIGS. 15-20. The angle measurement device 20 is suitable for use with rigid electrical conduit or electrical metal tubing (EMT).

As shown in FIG. 1, the angle measurement device 20 has an upper clamp 36 and a lower clamp 38 which are connected together at a pivot 40. The upper clamp 36 pivots relative to the lower clamp 38 around the pivot 40. A biasing member 42 is provided to bias the upper and lower clamps 36, 38 into a closed position. A vertical central axis CA, see FIG. 2, is defined from a front end of the angle measurement device 20 to a rear end of the angle measurement device 20.

Figure 2:
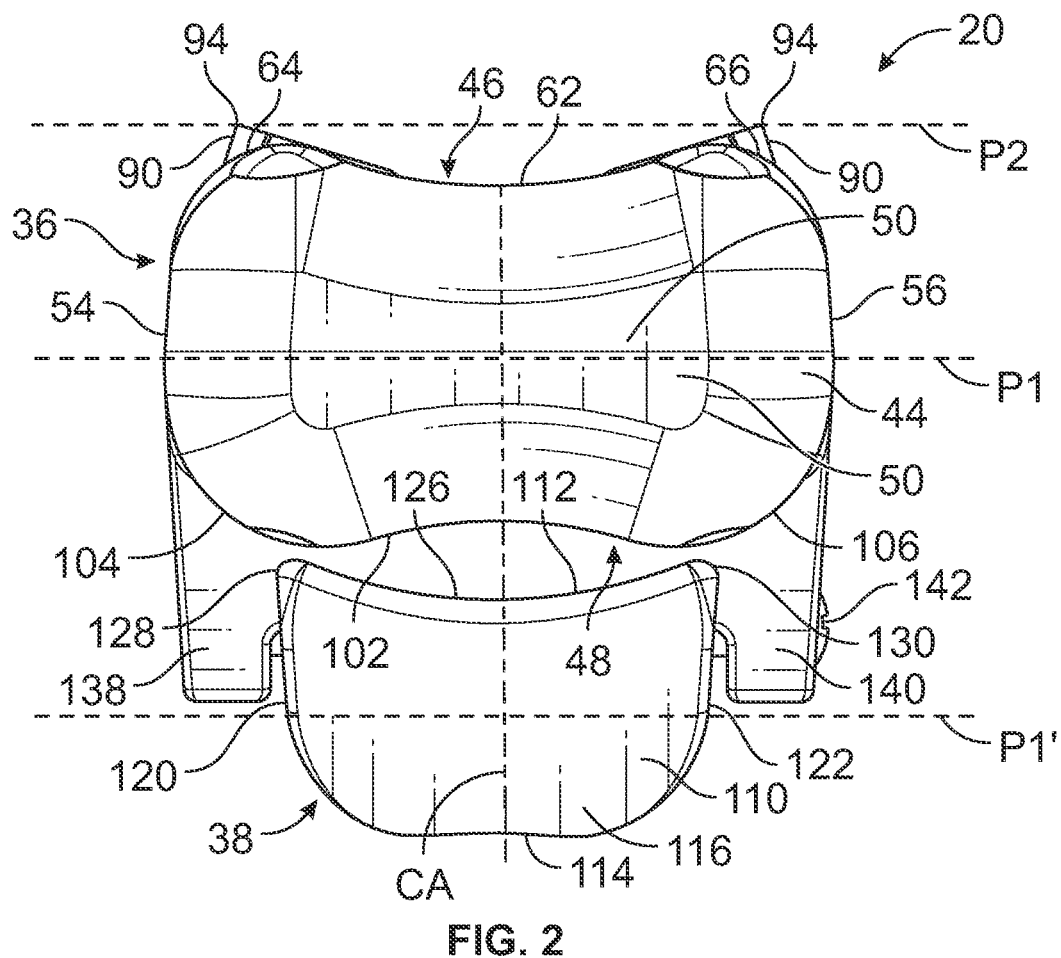
FIGS. 2-6 depict front plan views of the angle measurement device.

As shown in FIGS. 1 and 2, the upper clamp 36 is formed of an upper housing 44 having an upper surface 46 and an opposite lower surface 48, a front end surface 50, an opposite rear end surface 52, and first and second side surfaces 54, 56 extending between the surfaces 48, 50, 52. The upper housing 44 is formed of plastic, such as polycarbonate. A plane P1 is defined at the midpoint of the upper housing 44 and extends from the front end surface 50 to the rear end surface 52. The front end surface 50 may be curved. The side surfaces 54, 56 are generally parallel to each other; however, each side surface 54, 56 may be curved inward or outward. The rear end surface 52 is generally planar.

Figure 8:
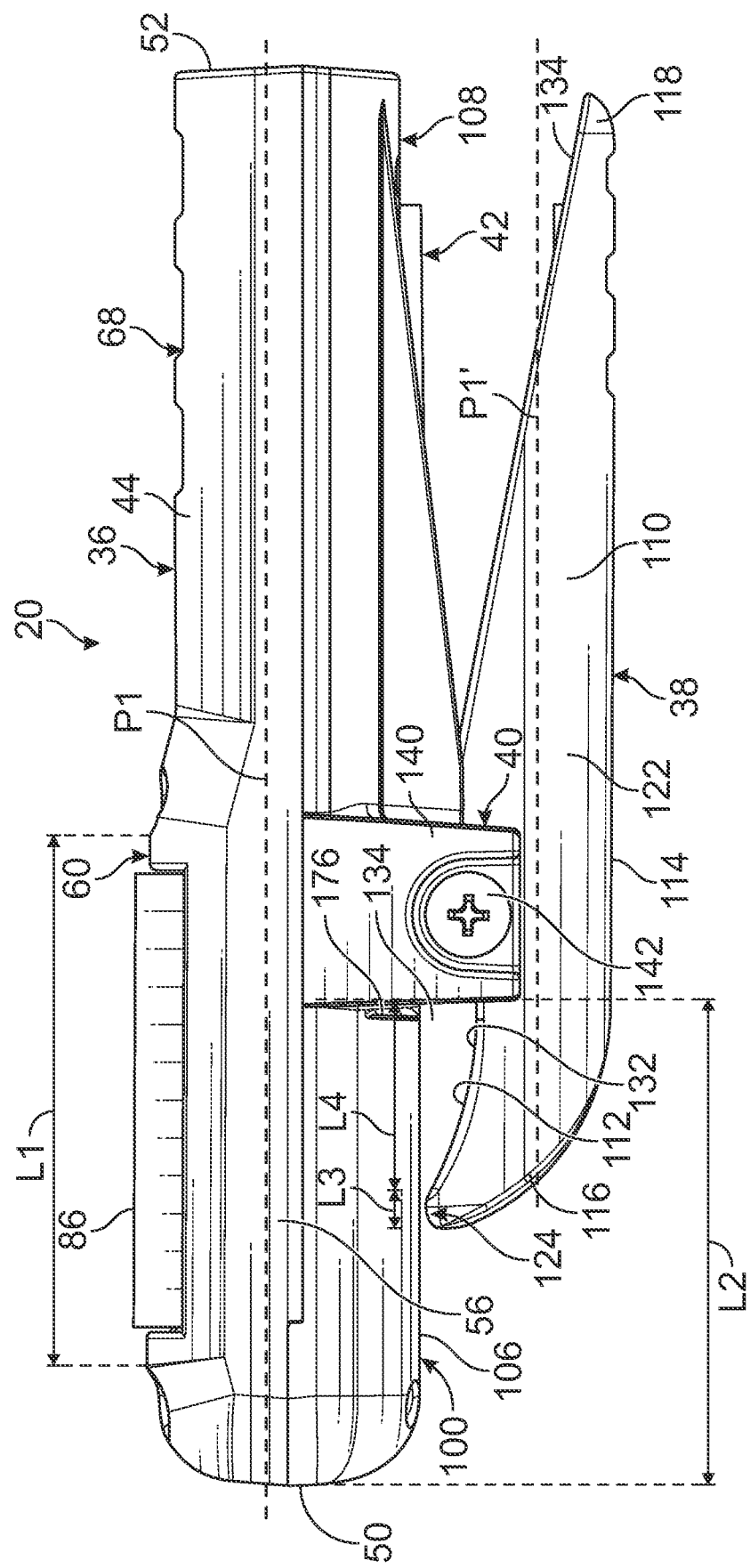
FIG. 8 depicts a side elevation view of the angle measurement device.

A front portion 60 of the upper surface 46, which extends for a length L1, see FIG. 8, from the front end surface 50, has a central surface section 62, a first surface section 64 extending from the central surface section 62 on one side thereof to the first side surface 54, and a second surface section 66 extending from the central surface section 62 on the other side thereof to the second side surface 56. The central surface section 62 is concave relative to plane P1, the first surface section 64 is convex relative to plane P1, and the second surface section 62 is convex relative to plane P1.

Figure 3:
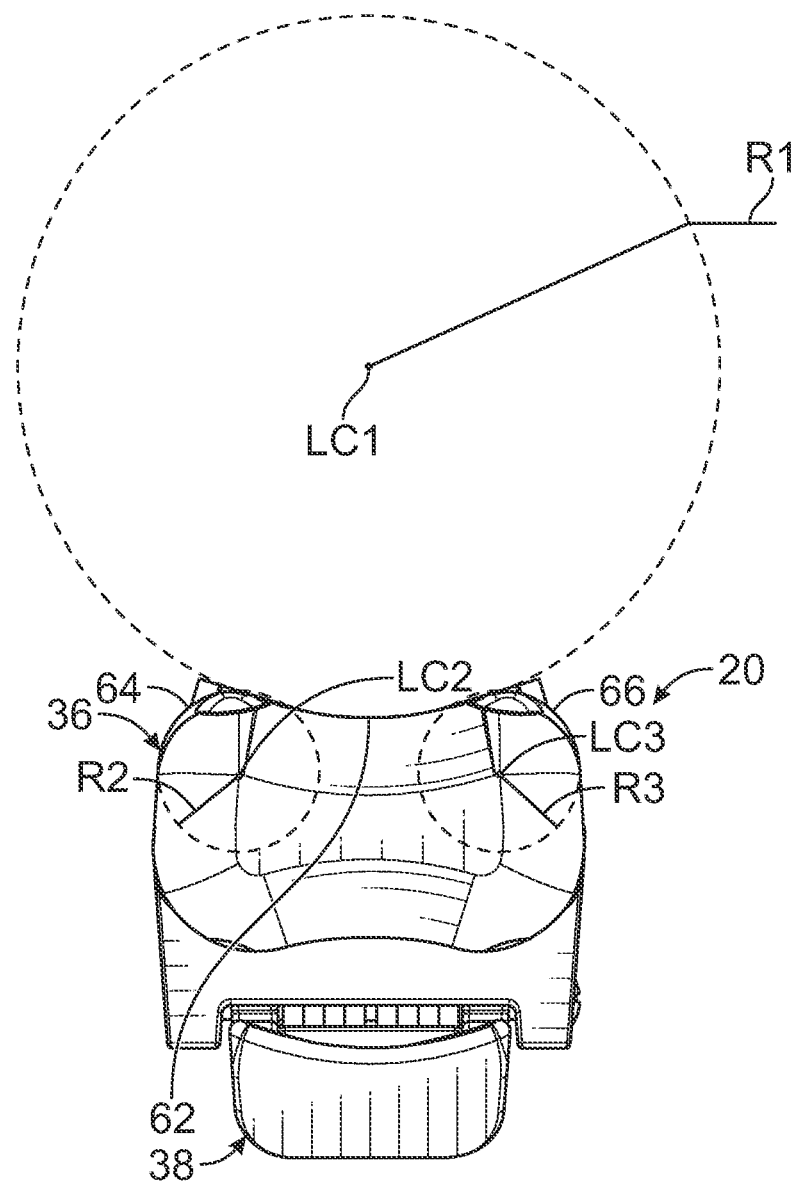

As shown in FIG. 3, the central surface section 62 has a constant radius R1 along all cross-sections along its length such that a longitudinal centerline LC1 is defined by the center of imaginary circles forming the radius R1. The longitudinal centerline LC1 is parallel to plane P1 and aligns with the central axis CA. The first surface section 64 has a constant radius R2 along all cross-sections along its length such that a longitudinal centerline LC2 is defined by the center of imaginary circles forming the radius R2. The second surface section 66 has a constant radius R3 along all cross-sections along its length such that a longitudinal centerline LC3 is defined by the center of imaginary circles forming the radius R3. Radii R2 and R3 are the same. Radius R1 is substantially greater than radii R2, R3. The longitudinal centerlines LC2, LC3 are parallel to each other, are vertically above plane P1, and are vertically aligned with each other relative to plane P1. In an embodiment, the longitudinal centerlines LC2, LC3 are vertically below plane P1 or aligned with plane P1. The longitudinal centerlines LC2, LC3 are parallel to, and vertically below, the longitudinal centerline LC1 of the central surface section 62. The longitudinal centerlines LC2, LC3 are equally spaced from the longitudinal centerline LC1.

The upper surface 46 has a rear portion 68 extending from the front portion 60 to the rear end surface 52. The rear portion 68 may be planar or substantially planar.

Figure 9:
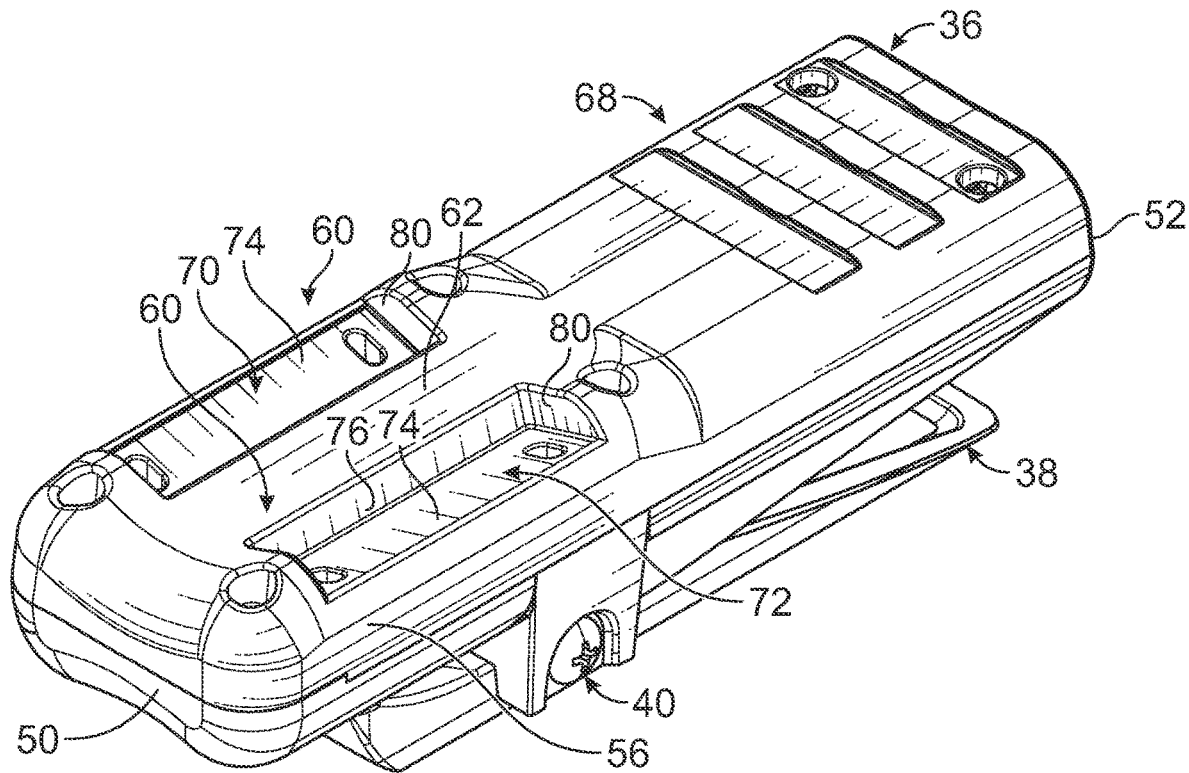
FIG. 9 depicts a perspective view of the angle measurement device with magnetic elements and magnet channels removed.
Figure 10:
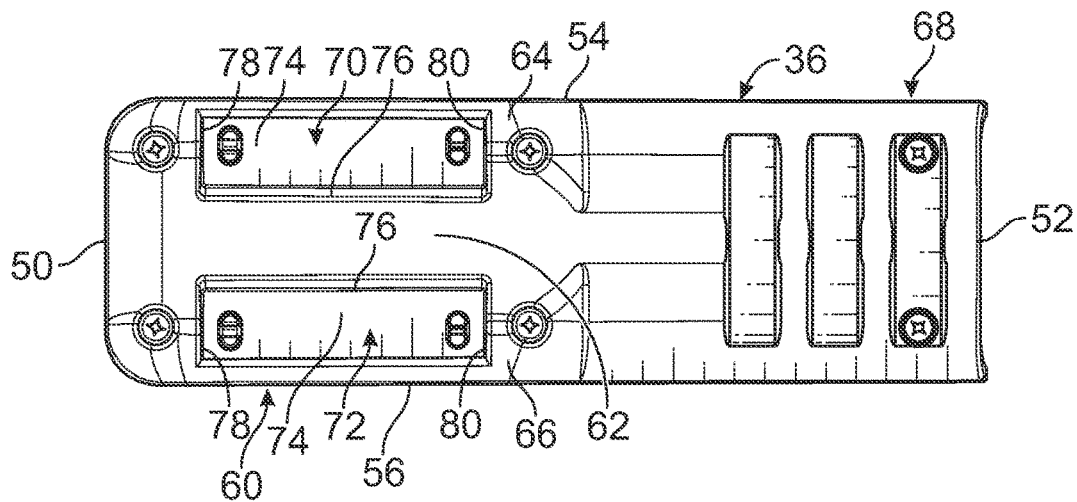
FIG. 10 depicts a top plan view of the angle measurement device with magnetic elements and magnet channels removed.

Longitudinally extending recesses 70, 72, see FIGS. 9 and 10, are formed in the front section 60 and a spaced apart from each other. The recess 70 extends partially along the first surface section 64 and the central surface section 62. The recess 72 is extends partially along the second surface section 66 and the central surface section 62. The recesses 70, 72 may have the same length. In an embodiment, each recess 70 has a bottom wall 74 which extends at an angle relative to plane P1, and a side wall 76 which extends from the lower end of the bottom wall 74 to the central surface section 62 at an angle relative to plane P1. In the embodiment as shown, each bottom wall 74 extends from a high point proximate to the respective side wall 54, 56 to a low point proximate to, but spaced from, the midpoint of the central surface section 62. Each recess 70, 72 is further formed by a front wall 78 at a front end of the bottom wall 74, and a rear wall 80 at a rear end of the bottom wall 74.

Figure 11:
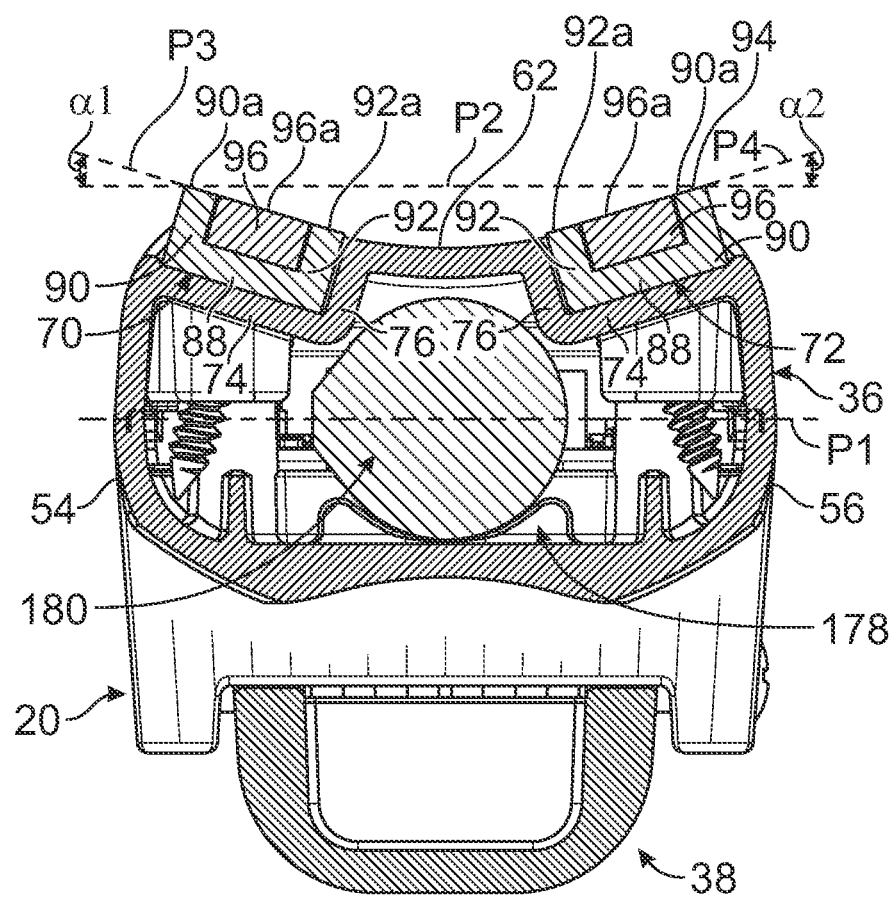
FIGS. 11-13 depict cross-sectional views of the angle measurement device according to first, second and third embodiments.

As shown in FIGS. 8 and 11, a magnet which includes a magnet channel 86 and a magnetic element 96 is mounted within each recess 70, 72. Each magnet channel 86 is generally U-shaped, having a planar bottom wall 88, and side walls 90, 92 extending upwardly from the opposite sides of the bottom wall 88. The bottom wall 88 of the magnet channel 86 mounted in recess 70 abuts against, and is affixed to, the bottom wall 74 of the recess 70, and the side wall 92 of the magnet channel 86 mounted in recess 70 abuts against the side wall 76 of recess 70. The bottom wall 88 of the magnet channel 86 mounted in the recess 72 abuts against, and is affixed to, the bottom wall 74 of the recess 72, and the side wall 92 of the magnet channel 86 mounted in recess 72 abuts against the side wall 76 of the recess 72. An upper corner 94 of each side wall 90 defines a plane P2 which is vertically above the central surface section 62 and the first and second surface sections 64, 66 when viewed from a front of the angle measurement device 20 as shown in FIG. 2. The corners 94 are spaced apart from each other by a distance Z, see FIG. 6.

Figure 6:
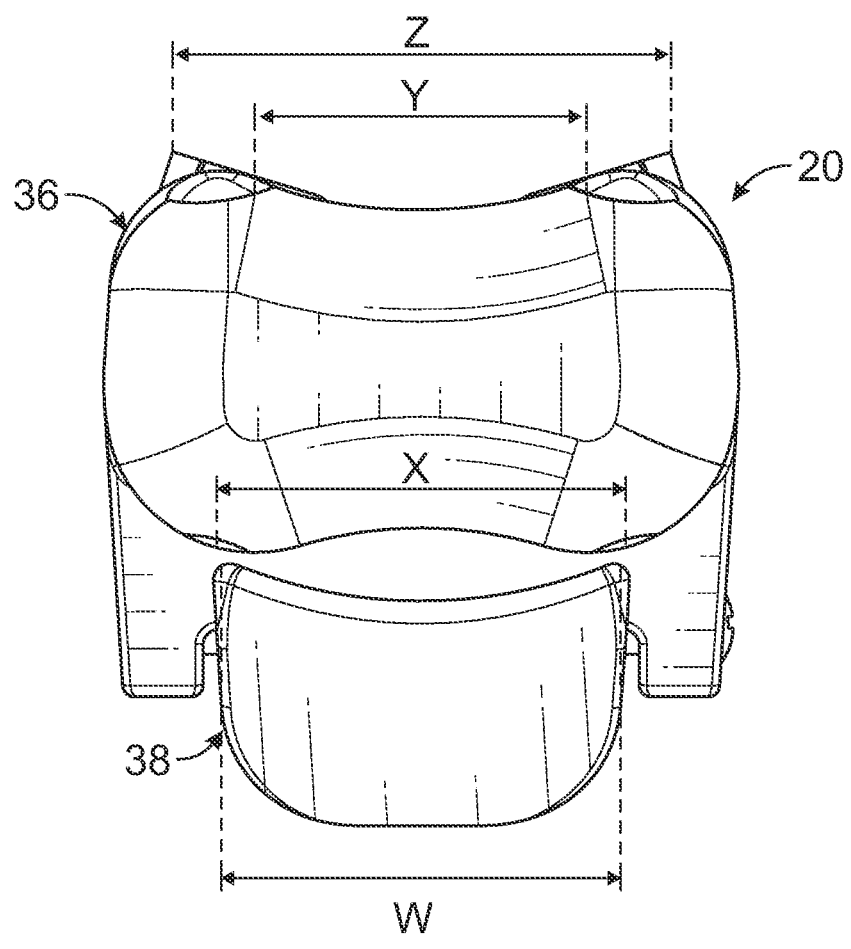
Figure 14:
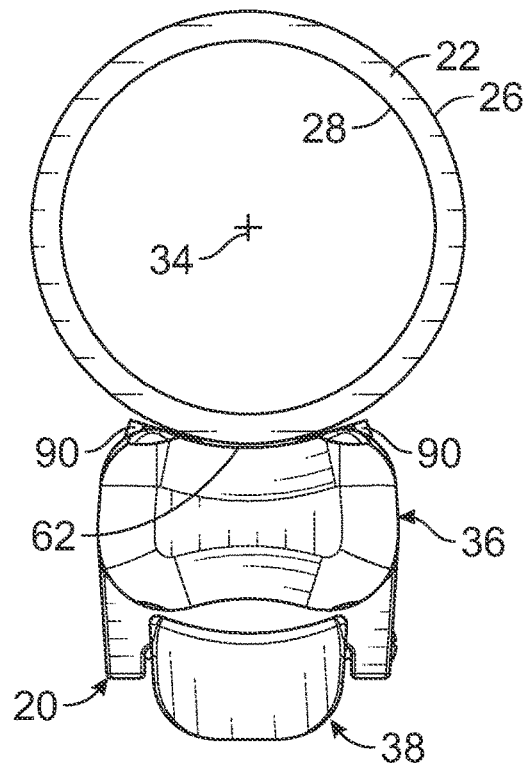
FIGS. 14-21 depict front plan views of the angle measurement device with a workpiece attached thereto in various positions.
Figure 18:
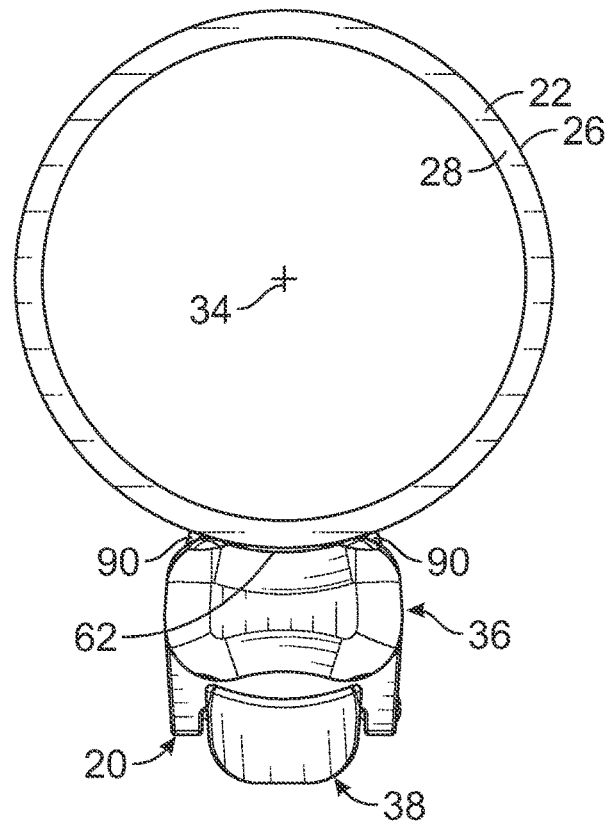

Plane P2 is parallel to plane P1. Upper ends 90a, 92a of the side walls 90, 92 of the magnet channel 86 mounted in recess 70 define a plane P3 which is at an angle of α1 relative to plane P2. Plane P3 may be generally tangential to the central surface section 62. The upper ends 90a, 92a of the side walls 90, 92 of the magnet channel 86 mounted in recess 72 define a plane P4 which is at an angle of α2 relative to plane P2. Plane P4 may be generally tangential to the central surface section 62. The angles α1, α2 are formed by intersecting lines and are congruent. Angles α1, α2 may be with the range of about 0 degrees to about 45 degrees. In a preferred embodiment, angles α1, α2 are 17 degrees. Distance Y in FIG. 6 shows an ideal tangential contact point of the magnetic elements 96 when the angle measurement device 20 is placed on the outside diameter of the workpiece 22 as shown in FIGS. 14 and 18. Distance Y is variable depending upon the different workpiece 22 sizes and the angles of the magnetic elements 96.

A magnetic element 96 is mounted within each magnet channel 86. An upper surface 96a of each magnetic element 96 is flush with, or slightly below planes P3, P4. The angles α1, α2 provide for an optimized amount of magnet material proximate to the workpiece 22. This directly correlates to the function of the magnetic element 96. At least one magnetic element 96 is seated within each magnet channel 86 and is affixed thereto, for example by adhesive. In addition, the magnetic properties of the magnetic elements 96 serve to anchor the magnetic elements 96 within the magnet channels 86. An example of a suitable magnetic element 96 is a neodymium channel magnets sold by CMS Magnetics. The magnet channel 86 is conductive and redirects the magnetic force from the back side of the magnetic element 96 forward to double the effective usable force on a single side of the magnetic element 96.

Figure 13:
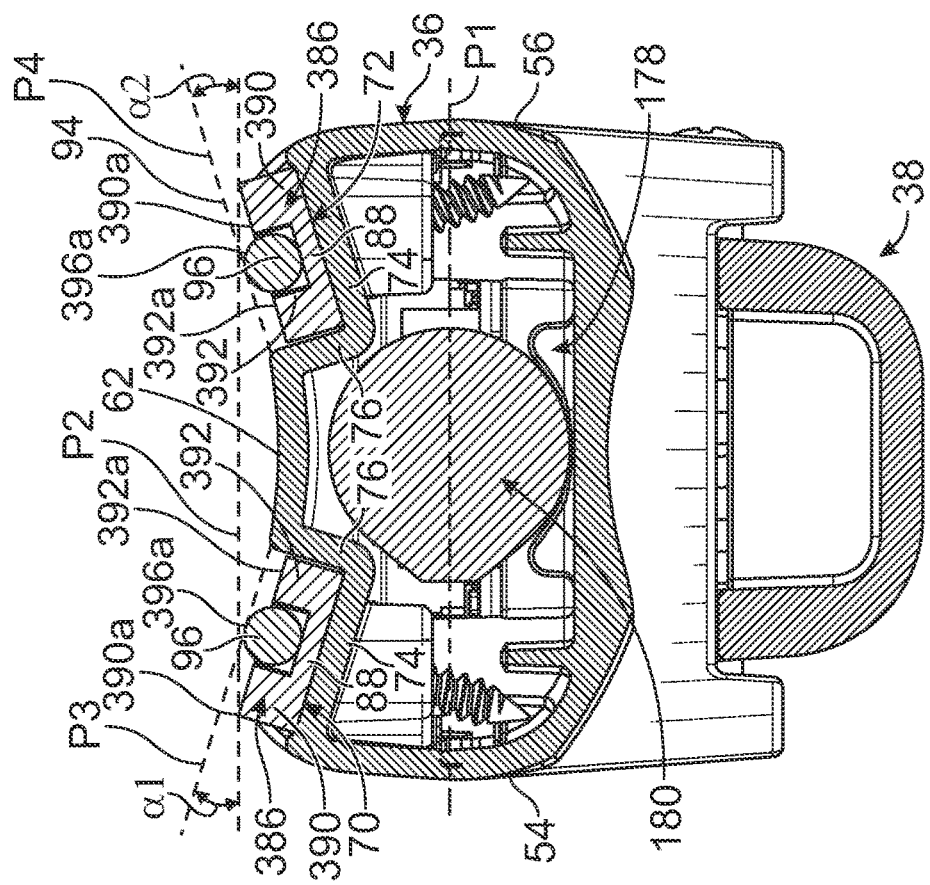
Figure 12:
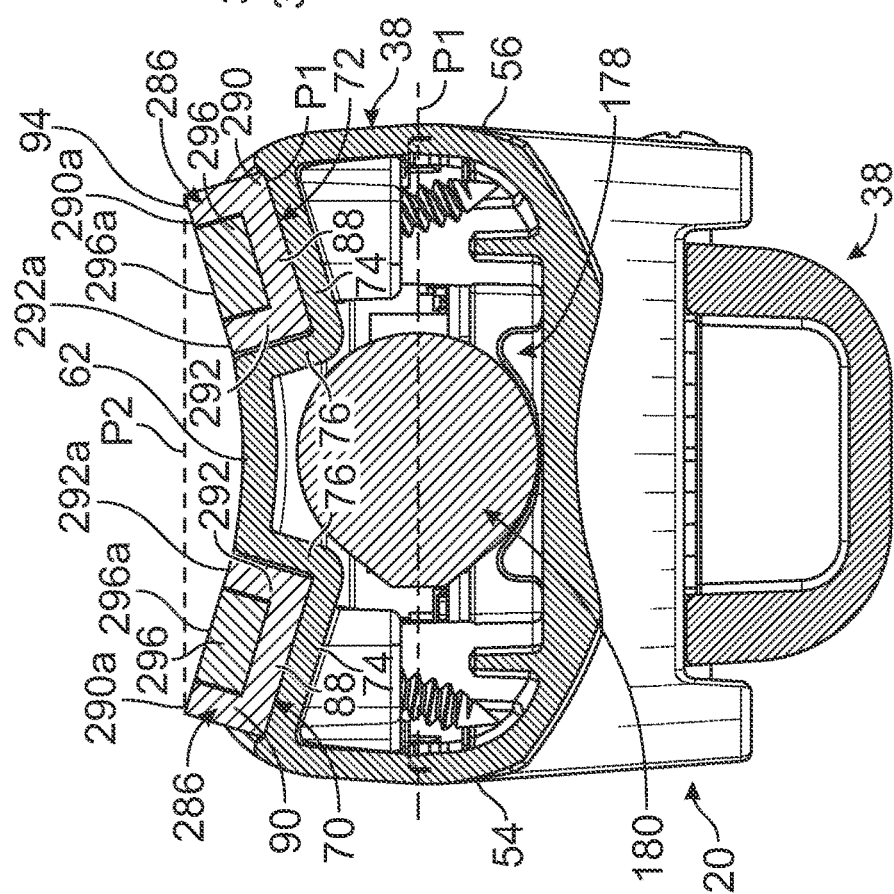

FIGS. 12 and 13 show alternate embodiments of magnetic elements 96, with that shown in FIG. 12 having like elements of magnetic elements 96 labeled with like reference numerals in the two hundreds, and with that shown in FIG. 13 having like elements of magnetic elements 96 labeled with like reference numerals in the three hundreds. In another embodiment as shown in FIG. 12, the upper ends 290a, 292a of the side walls 290, 292 of each magnet channel 286 and the upper surfaces 296a of each magnetic element 296 are curved at the same radius as the central surface section 62. In another embodiment as shown in FIG. 13, the upper ends 390a, 392a of the side walls 390, 392 of each magnet channel 386 are vertically below the curve defined by the central surface section 62 when viewed from a front of the angle measurement device 20. At least one magnetic element 396 is seated within each magnet channel 386. Each magnetic element 396 has a rounded upper surface 396a that extends above the upper ends 390a, 392a.

The magnetic elements 96, 296, 396 are aligned to the centerline 34 of the workpiece 22 to provide for quality alignment of the magnetic force across multiple radii of pipe. The magnetic elements 96, 296, 396 are angled to each other in an optimized fashion for a variety of radii of workpiece sizes.

As shown in FIGS. 2 and 8, a front portion 100 of the lower surface 48, which extends for a length L2 from the front end surface 50, has a central surface section 102, a first surface section 104 extending from the central surface section 102 on one side thereof to the first side surface 54, and a second surface section 106 extending from the central surface section 102 on the other side thereof to the second side surface 56. The central surface section 102 is concave relative to plane P1, the first surface section 104 is convex relative to plane P1, and the second surface section 106 is convex relative to plane P1.

Figure 4:
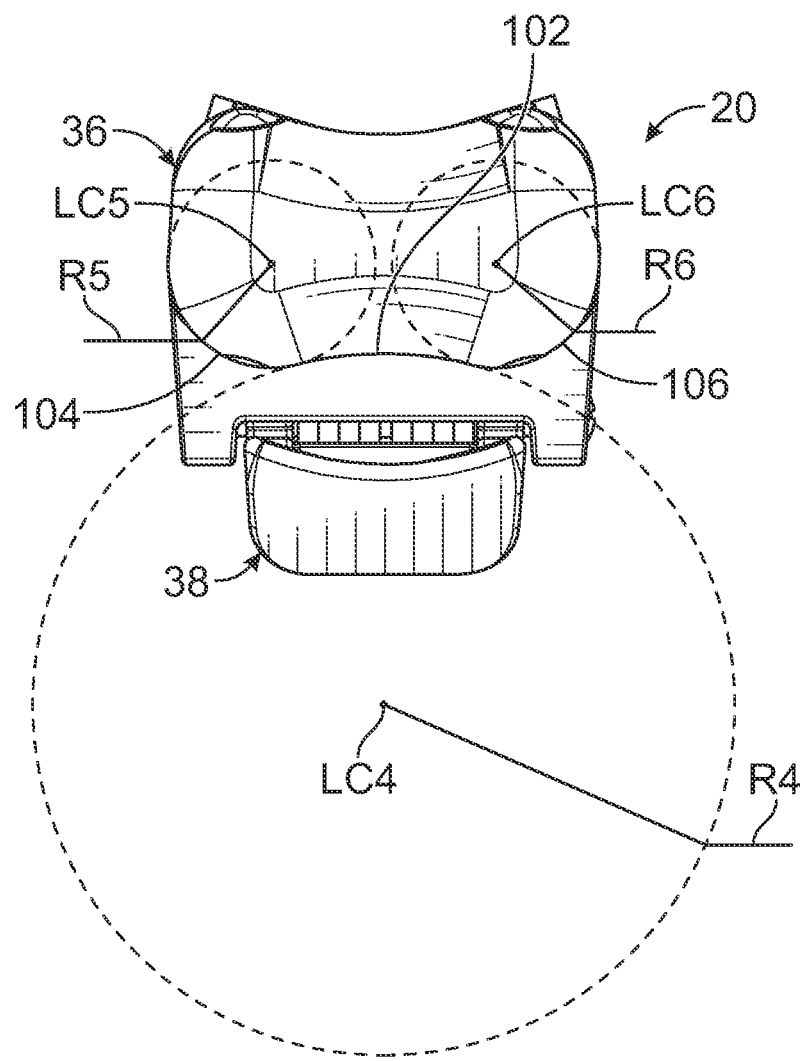

As shown in FIG. 4, the central surface section 102 has a constant radius R4 along all cross-sections along its length such that a longitudinal centerline LC4 is defined by the center of imaginary circles forming the radius R4. The longitudinal centerline LC4 is parallel to plane P1 and is vertically aligned with the longitudinal centerline LC1 and the central axis CA. The first surface section 104 has a constant radius R5 along all cross-sections along its length such that a longitudinal centerline LC5 is defined by the center of imaginary circles forming the radius R5. The second surface section 106 has a constant radius R6 along all cross-sections along its length such that a longitudinal centerline LC6 is defined by the center of imaginary circles forming the radius R6. Radii R5 and R6 are the same. Radius R4 is substantially greater than radii R5, R6. The longitudinal centerlines LC5, LC6 are parallel to each other, are vertically below plane P1, and are vertically aligned with each other relative to plane P1. In an embodiment, the longitudinal centerlines LC5, LC6 are vertically above plane P1 or aligned with plane P1. The longitudinal centerlines LC5, LC6 are parallel to, and vertically above, the longitudinal centerline LC4 of the central surface section 102. The longitudinal centerlines LC5, LC6 are equally spaced from the longitudinal centerline LC4.

The lower surface 48 has a rear portion 108, see FIG. 8, extending from the front portion 100 to the rear end surface 52. The rear portion 108 may be planar or substantially planar.

As shown in FIGS. 1 and 2, the lower clamp 38 is formed of a lower housing 110 having an upper surface 112 and an opposite lower surface 114, a front end surface 116, an opposite rear end surface 118, and first and second side surfaces 120, 122 extending between the surfaces 114, 116, 118. The lower housing 110 is formed of plastic, such as polycarbonate. A plane P1' is defined at the midpoint of the lower housing 110 and extends from the front end surface 116 to the rear end surface 118. The lower surface 48 of the upper housing 44 faces the upper surface 112 of the lower housing 110.

The front end surface 116 curves from the upper surface 112 to the lower surface 114 when viewed from the side as shown in FIG. 4. The lower surface 114 is planar or substantially planar. The side surfaces 120, 122 are generally parallel to each other; however, each side surface 120, 122 may be curved inward or outward.

As shown in FIGS. 2 and 8, a front portion 124 of the upper surface 112, which extends for a length L3 from the front end surface 116, has a central surface section 126, a first surface section 128 extending from the central surface section 126 on one side thereof to the first side surface 120, and a second surface section 130 extending from the central surface section 126 on the other side thereof to the second side surface 122. The central surface section 126 is concave relative to plane P1', the first surface section 128 is convex relative to plane P1', and the second surface section 130 is convex relative to plane P1.

Figure 5:
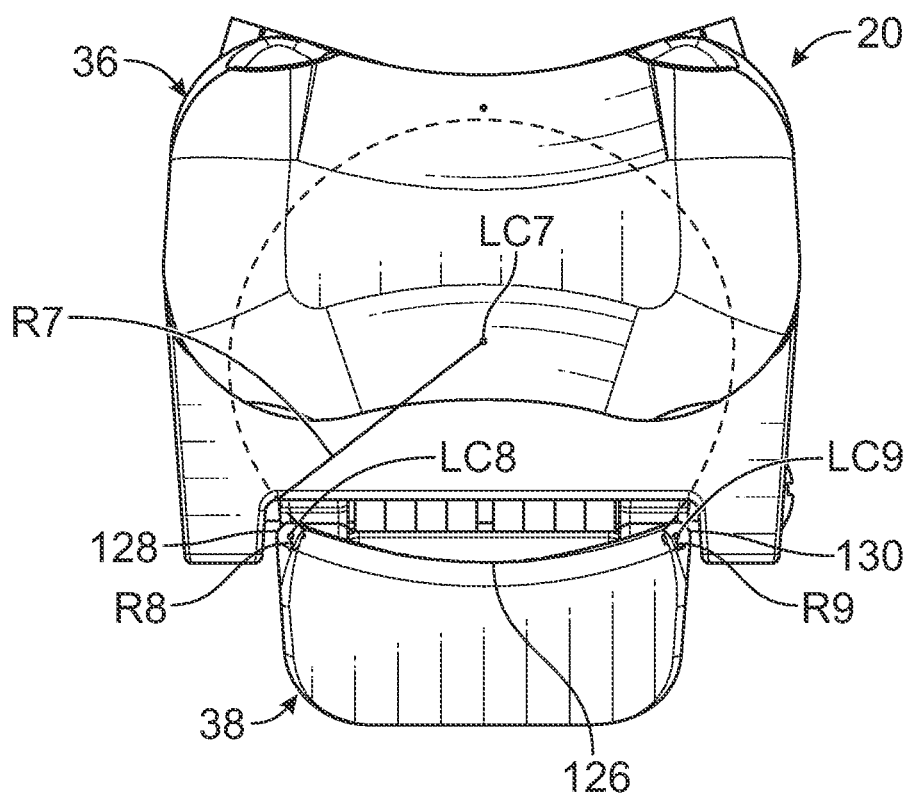
Figure 16:
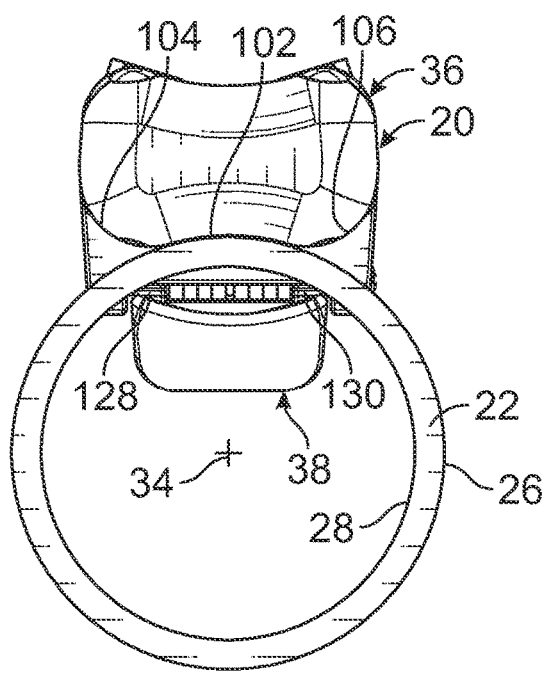
Figure 20:
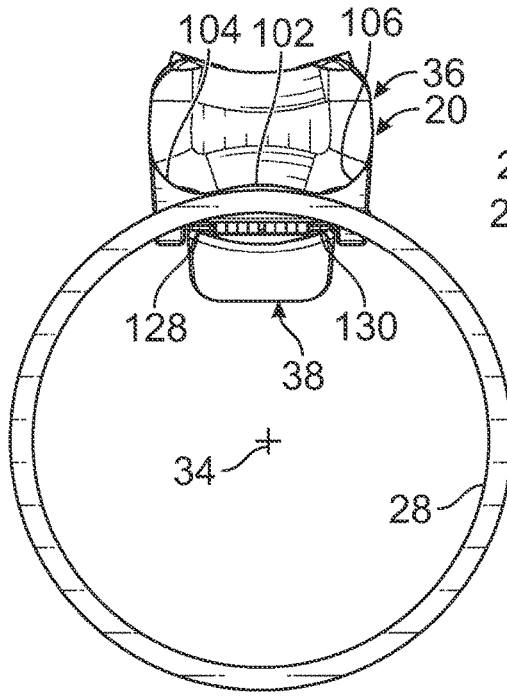

As shown in FIG. 5, the central surface section 126 has a constant radius R7 along all cross-sections along its length such that a longitudinal centerline LC7 is defined by the center of imaginary circles forming the radius R7. The longitudinal centerline LC7 is parallel to plane P1'. The first surface section 128 has a constant radius R8 along all cross-sections along its length such that a longitudinal centerline LC8 is defined by the center of imaginary circles forming the radius R8. The second surface section 130 has a constant radius R9 along all cross-sections along its length such that a longitudinal centerline LC9 is defined by the center of imaginary circles forming the radius R9. Radii R8 and R9 are the same. Radius R7 is substantially greater than radii R8, R9. The longitudinal centerlines LC8, LC9 are parallel to each other, are vertically above plane P1', and are vertically aligned with each other relative to plane P1'. The longitudinal centerlines LC8, LC9 are parallel to, and vertically above, the longitudinal centerline LC7. The longitudinal centerlines LC8, LC9 are equally spaced from the longitudinal centerline LC7. The longitudinal centerline LC7 is vertically aligned with longitudinal centerline LC1, longitudinal centerline LC4, and the central axis CA. As shown in FIG. 6, distance W shows a distance between contact points of the angle measurement device 20 provided by surfaces 128, 130 when the angle measurement device 20 is attached to the workpiece 22 as shown in FIGS. 16 and 20.

An intermediate portion 132 of the upper surface 112, which extends for a length L4, see FIG. 8, from the front portion 124, is curved when viewed from the side. The intermediate portion 132 curves downward from the front portion 124 to the pivot 40. As such, when the upper and lower clamps 36, 38 are closed, a space 134 is provided therebetween when viewed from the side as shown in FIG. 8.

A rear portion 136 of the upper surface 112 extends from the pivot 40 to the rear end surface 118. The rear portion 132 may be planar or substantially planar and is parallel or substantially parallel to plane P1'.

As an example, R1 is 1.435", R4 is 1.275", R5 and R6 are 0.47", and R7 is 1.5". The radii of R2 and R3 are such that the surfaces are below the corners 94 of the magnet channels 86, 286, 386.

FIGS. 14-17 are representations of the angle measurement device 20 attached to 2.5' workpiece 22. FIGS. 18-21 are representations of the angle measurement device 20 attached to 4' workpiece 22.

In a first position as shown in FIGS. 14 and 18, the outer surface 26 of the workpiece 22 is engaged with the angle measurement device 20 using the magnetic elements 96, 296, 396. The outer surface 26 of the workpiece 22 seats against the magnet channels 86, 286, 386 and may have point contacts with the magnetic elements 96, 296, 396. In some embodiments, the outer surface 26 is proximate to the central surface section 62. In some embodiments, the central surface section 62 is radiused such that the outer surface 26 has contact therewith. The magnetic elements 96, 296, 396 hold the angle measurement device 20 to the outer surface 26 of the workpiece 22. In this first position, the biasing member 42 is not used, other than to position the lower clamp 38 relative to the upper clamp 36 to provide a clean appearance.

Figure 15:
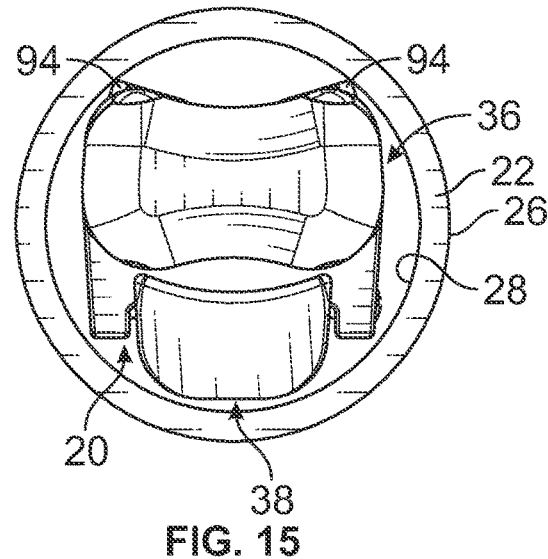
Figure 19:
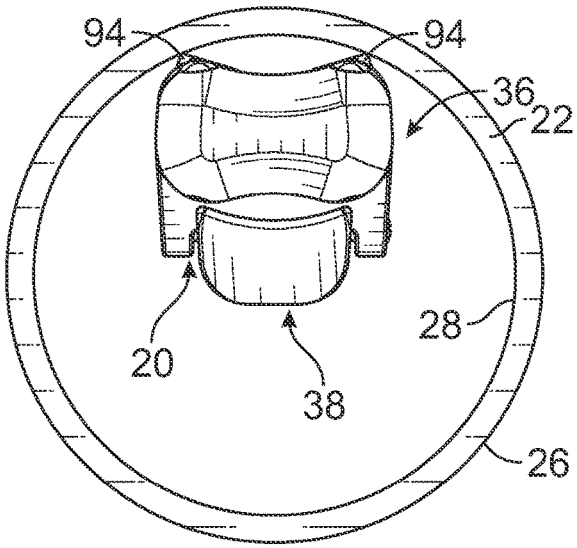

In a second position as shown in FIGS. 15 and 19, the angle measurement device 20 is within the passageway defined by the inner surface 28 of the workpiece 22, and the inner surface 28 is engaged with the angle measurement device 20 using the magnetic elements 96, 296, 396. The inner surface 28 seats against the corners 94 of the magnet channels 86, 286, 386 in point contacts. In some embodiments, the corners 94 of the magnet channel 86, 286, 386 are rounded where workpiece 22 seats thereagainst. The magnetic elements 96, 296, 396 hold the angle measurement device 20 to the inner surface 28 of the workpiece 22. In this position, the biasing member 42 is not used, other than to position the lower clamp 38 relative to the upper clamp 36 to minimize the size of the angle measurement device 20 within the workpiece 22 and to provide a clean appearance.

In a third position as shown in FIGS. 16 and 20, the upper clamp 36 is positioned on the outer surface 26 of the workpiece 22 and the lower clamp 38 is positioned within the central cylindrical passageway defined by the inner surface 28. In this third position, the biasing member 42 biases the upper and lower clamps 36, 38 into the closed position to clamp the angle measurement device 20 on the workpiece 22. The outer surface 26 of the workpiece 22 engages against one or more of the surface sections 102, 104, 106, depending upon the diameter of the workpiece 22. As shown in FIG. 16, the outer surface 26 engages against all of the surface sections 102, 104, 106, and as shown in FIG. 20, the outer surface 26 engages against surface sections 104, 106. The inner surface 28 of the workpiece 22 engages against surface sections 128, 130. The engagement with the surface sections 128, 130 creates a simple opposing point clamp that creates a stable hold under a variety of small loading positions.

Figure 17:
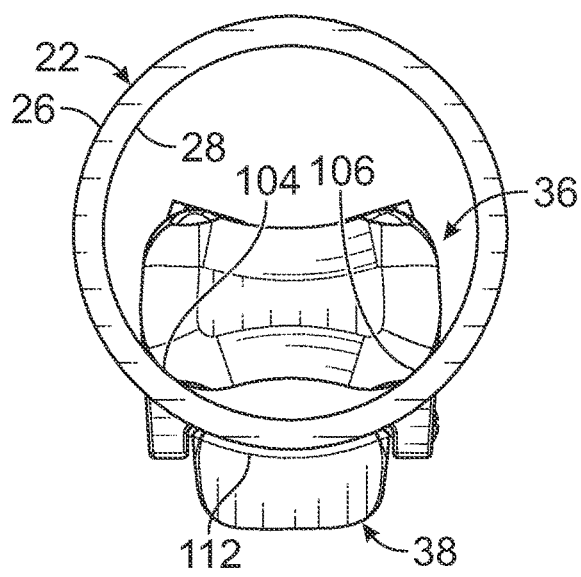
Figure 21:
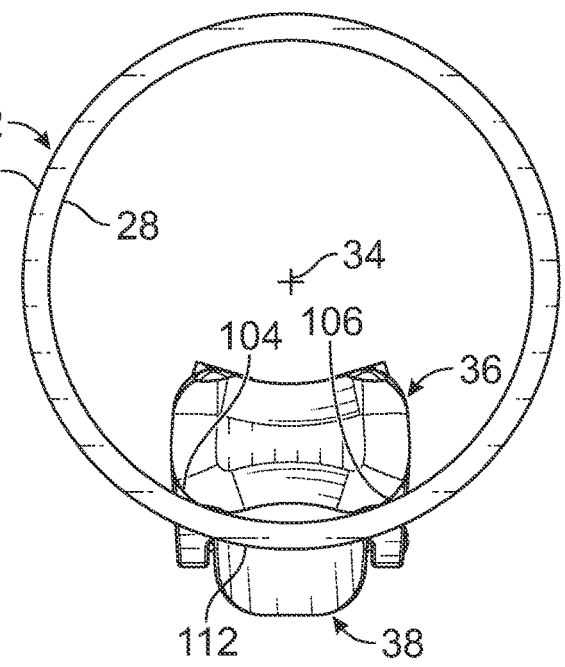

In a fourth position as shown in FIGS. 17 and 21, the upper clamp 36 is positioned within the passageway defined by the inner surface 28 of the workpiece 22 and the lower clamp 38 is positioned on the outer surface 26 of the workpiece 22. In this fourth position, the biasing member 42 biases the clamps into the closed position to clamp the angle measurement device 20 on the workpiece 22. The inner surface 28 of the workpiece 22 engages against the surface sections 104, 106 and the outer surface 26 engages against central surface section 126.

The pivot 40 includes first and second ears 138, 140 extending downward from the upper housing 44 of the upper clamp 36, first and second ears 142, 144 extending upward from the lower housing 110 of the lower clamp 38 and a pivot pin 146. The ears 138, 140 extend downward from the lower surface 48 of the upper housing 44 rearward of the front portion 100. The ears 142, 144 extend upward from the upper surface 112 of the lower housing 110 rearward of the intermediate portion 132. The first ear 138 abuts against the first ear 142, the second ear 140 abuts against the second ear 144, and a space is provided between the pairs of ears 138, 142 and 140, 144. The pivot pin 146 extends through the pairs of ears 138, 142, through the space and through the pairs of ears 140, 144.

In an embodiment, the biasing member 42 is provided by two side-by-side springs 148, 150. Each spring has a coiled section 152 wrapped around the pivot pin 146, an upper leg 154 in contact with the rear portion 108 of the lower surface 48 of the upper clamp 36, and a lower leg 156 in contact with the rear portion 108 of the lower surface 48 of the lower clamp 38. The dual springs 148, 150 create even distribution of loading and maintains the angle measurement device 20 coaxial to the workpiece 22. The dual springs 148, 150 also deter twisting of the upper and lower clamps 36, 38.

Figure 7:
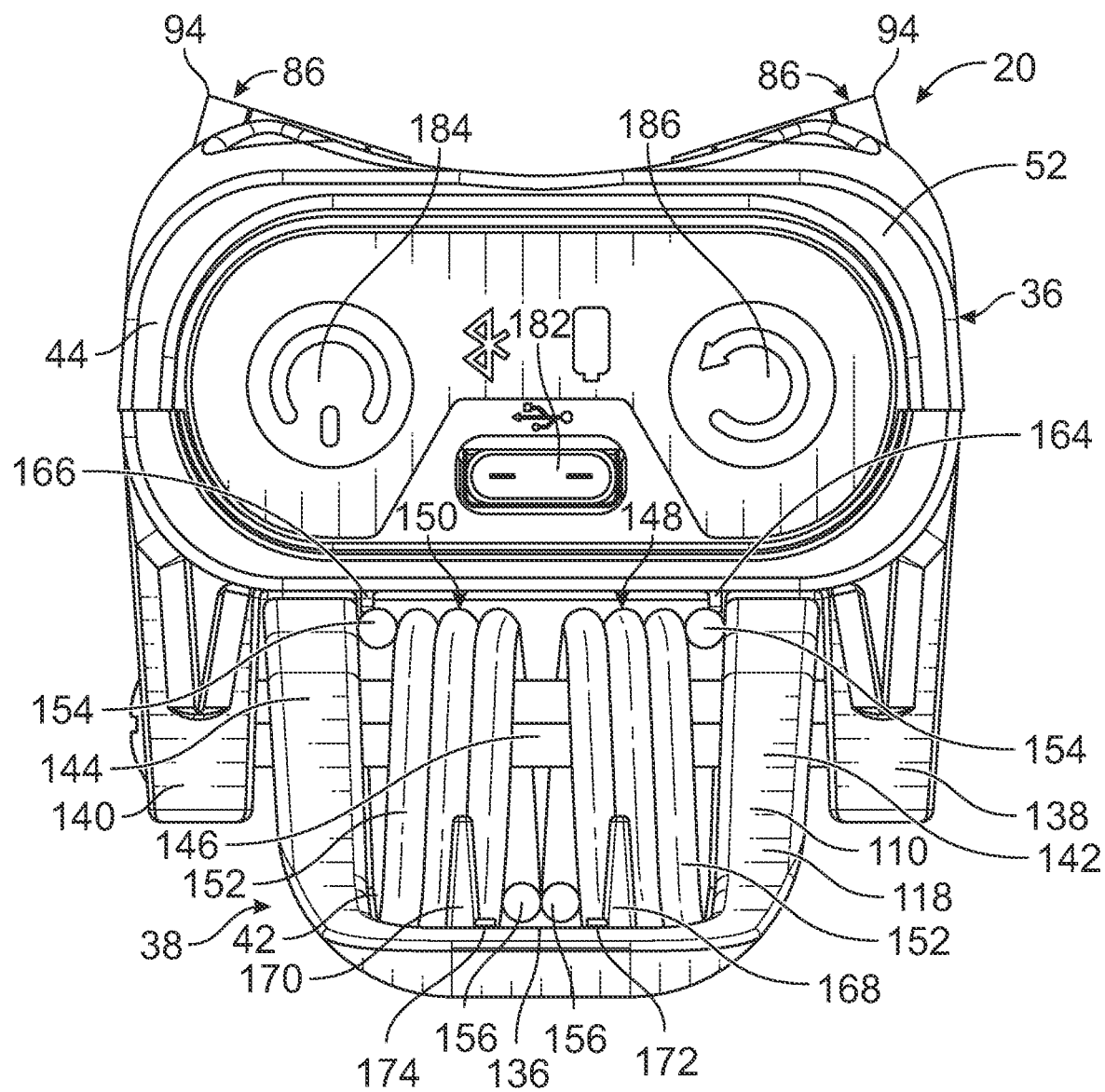
FIG. 7 depicts a rear plan view of the angle measurement device.
Figure 22:
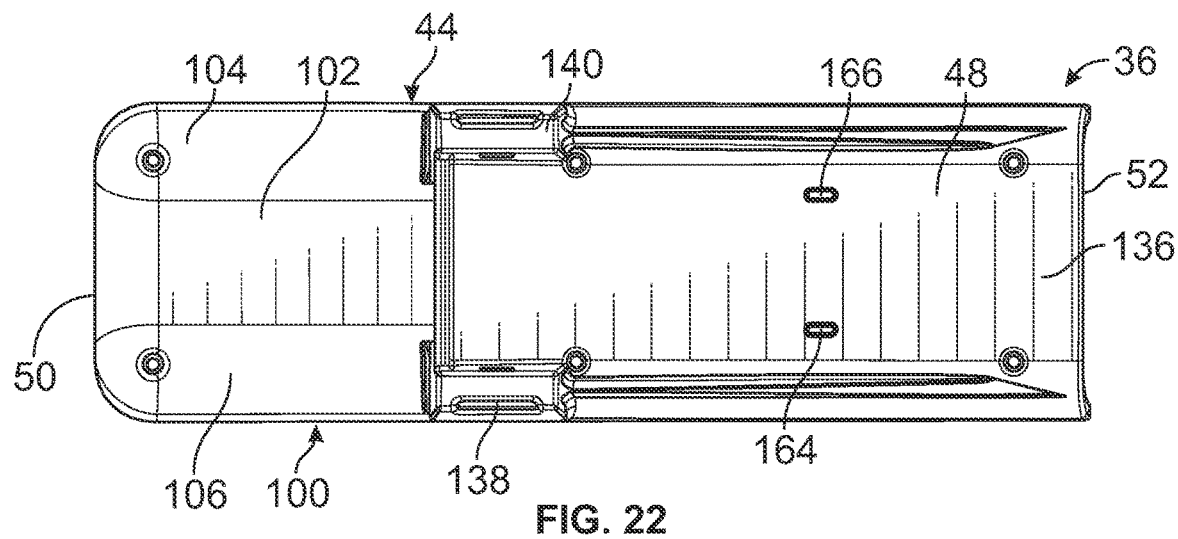
FIG. 22 depicts a bottom plan view of an upper clamp of the angle measurement device.
Figure 23:
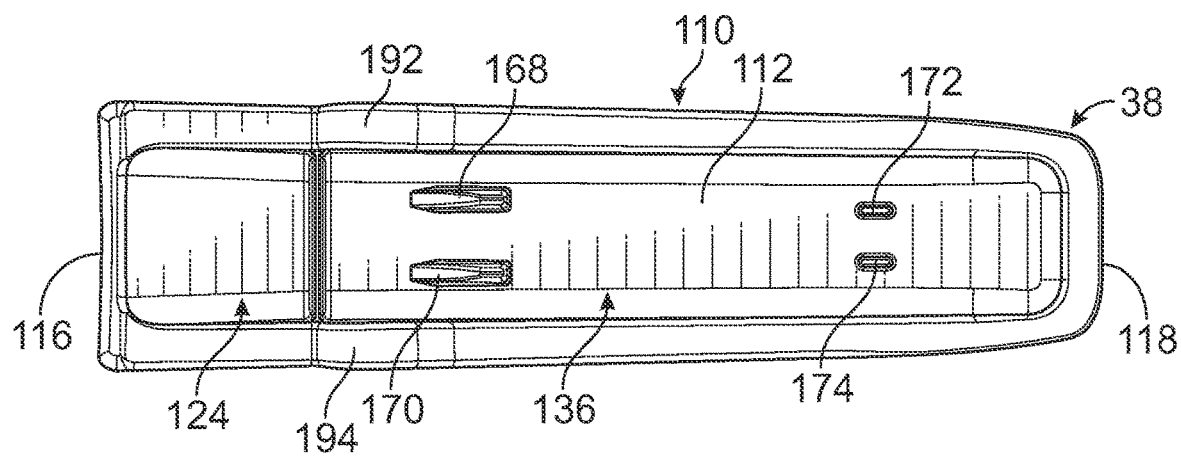
FIG. 23 depicts a top plan view of a lower clamp of the angle measurement device.

The upper legs 154, 156 engage with upper nubs 164, 166, see FIGS. 7 and 22, that extend downward from the lower surface 48 of the rear portion 108 of the upper clamp 36. The upper nubs 164, 166 are spaced from the rear end 52 of the upper housing 44. As shown in FIG. 7, the upper legs 154 are positioned between the upper nubs 164, 166. The coiled sections 152 engage with forward nubs 168, 170, see FIGS. 7 and 23, that extend upward from the upper surface 112 of the rear portion 136 of the lower housing 110 of the lower clamp 38. The lower legs 156 engage with rearward nubs 172, 174 that extend upward from the upper surface 112 of the rear portion 136 of the lower housing 110 of the lower clamp 38. The rearward nubs 172, 174 are between the forward nubs 168, 170 and the rear end 118 of the lower housing 110. As shown in FIG. 7, the lower legs 156 are positioned between the lower nubs 172, 174. The nubs 164, 166, 168, 170, 172, 174 keep the dual springs 148, 150 from twisting, properly position the dual springs 148, 150 relative to the upper and lower clamps 36, 38, and causes the dual springs 148, 150 to apply the force in the desired direction. Other biasing members are within the scope of the present invention. For example, the biasing member 42 may be a rotatable fastener that passes through each of the clamps 36, 38, that, when rotated, moves the clamps 36, 38 to the closed position. Another example is that a strap, a chain, and the like may be placed around the outer surfaces of the clamps 36, 38 and tightened to moves the clamps 36, 38 to the closed position. A clamp that engages with the upper surface 46 of the upper clamp 36 and the lower surface 114 of the lower clamp 38 may be used to move the clamps 36, 38 to the closed position.

A recess 176, see FIG. 8, is provided in the front portion 100 of the lower surface 48 forward of the ears 138, 144. The recess 176 extends partially along the first surface section 104, along the width of the central surface section 102, and partially along the second surface section 106. The recess 176 is above the space 134. When the workpiece 22 is mounted to the angle measurement device 20 in the third position shown in FIGS. 16 and 20, any burrs on an end of the workpiece 22 are positioned within the recess 176. When the workpiece 22 is mounted to the angle measurement device 20 in the fourth position shown in FIGS. 17 and 21, any burrs on an end of the workpiece 22 are positioned within the space 134. This provides for an improved engagement of the workpiece 22 with the angle measurement device 20.

A cavity 178 is formed within the upper housing 44 for housing electronic components 180 such as a battery, a sensor such as an inertial measurement unit, for example an accelerometer or a gyroscope as disclosed in United States Publication No. US-2021-0276064-A1, and a controller, amongst other electronic components 180. The angle measurement device 20 can communicate data wirelessly or by wire coupled to a USB port 182. The rear end surface 52 provides an area in which control buttons, such as a power button 184 and a reset button 186, are provided.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. An angle measurement device for positioning electronic components on a cylindrical workpiece comprising:
   a lower housing having an upper surface and a lower surface;
   an upper housing pivotally coupled to the lower housing at a pivot, the upper housing having an upper surface and a lower surface, the lower surface of the upper housing facing the upper surface of the lower housing;
   first and second magnetic elements mounted to the upper surface of the upper housing, the magnetic elements being spaced apart from each other, the magnetic elements are configured to be attached to the cylindrical workpiece; and
   a biasing member coupled to the upper and lower housings, the biasing member being configured to bias the upper and lower housings into a closed position, wherein the upper and lower housings are configured to be attached to the cylindrical workpiece when in the closed position.

2. The angle measurement device of claim 1, wherein a first plane is defined between the upper and lower surfaces of the upper housing, a second plane is defined by an uppermost surface of the first magnetic element, the second plane being angled at an angle relative to the first plane, and a third plane is defined by an uppermost surface of the second magnetic element, the third plane being angled at an angle relative to the first plane.

3. The angle measurement device of claim 2, wherein the second plane is angled at an angle of about 17 degrees relative to the first plane, and the third plane is angled at an angle of about 17 degrees relative to the first plane.

4. The angle measurement device of claim 1, wherein the lower surface of the upper housing has concave and convex surfaces formed therein.

5. The angle measurement device of claim 1, wherein the upper surface of the lower housing has a concave surface formed therein.

6. The angle measurement device of claim 1, wherein the lower surface of the upper housing has a central surface section, a first surface section extending from the central surface section to a side surface of the upper housing, the first surface section having a different profile than the central surface section, and a second surface section extending from the central surface section to an opposite side surface of the upper housing, the second surface section having a different profile than the central surface section, wherein the central surface section has a constant radius.

7. The angle measurement device of claim 6, wherein the radii defining the first and second surface sections are the same.

8. The angle measurement device of claim 7, wherein the radius defining the central surface section is greater than the radii defining the first and second surface sections.

9. The angle measurement device of claim 6, wherein the upper surface of the lower housing has a central surface section, a first surface section extending from the central surface section of the lower housing to a side surface of the lower housing, the first surface section of the lower housing having a different profile than the central surface section of the lower housing, and a second surface section extending from the central surface section of the lower housing to an opposite side surface of the lower housing, the second surface section of the lower housing having a different profile than the central surface section of the lower housing, wherein the central surface section of the lower housing has a constant radius.

10. The angle measurement device of claim 1, wherein the biasing member is at least one spring.

11. The angle measurement device of claim 1, wherein the biasing member are two springs positioned side-by-side.

12. The angle measurement device of claim 11, wherein the upper housing has a pair of upper nubs extending in a space in which the springs are mounted, the upper nubs engaging the springs, and wherein the lower housing has a pair of lower nubs extending in the space in which the springs are mounted, the lower nubs engaging the springs.

13. The angle measurement device of claim 1, wherein the upper housing includes a cavity therein; and further comprising at least one electronic component in the cavity.

14. The angle measurement device of claim 13, wherein the electronic components include an accelerometer or a gyroscope.

15. An angle measurement device for positioning electronic components on a cylindrical workpiece comprising:
  a lower housing having an upper surface and a lower surface, the upper surface having a central surface section, a first surface section extending from the central surface section to a side surface of the lower housing, the first surface section having a different profile than the central surface section, and a second surface section extending from the central surface section to an opposite side surface of the lower housing, the second surface section having a different profile than the central surface section, wherein the central surface section has a constant radius; and
  an upper housing coupled to the lower housing, the upper housing having an upper surface and a lower surface, the lower surface of the upper housing facing the upper surface of the lower housing, the lower surface of the upper housing having a central surface section, a first surface section extending from the central surface section of the upper housing to a side surface of the upper housing, the first surface section of the upper housing having a different profile than the central surface section of the upper housing, and a second surface section extending from the central surface section to an opposite side surface of the upper housing, wherein the central surface section of the upper housing has a constant radius, the second surface section of the upper housing having a different profile than the central surface section of the upper housing.

16. The angle measurement device of claim 15, wherein a plane of the upper housing is defined between the upper and lower surfaces thereof, and further comprising first and second magnetic elements mounted to the upper surface of the upper housing, the magnetic elements being spaced apart from each other, and wherein planes defined by uppermost surfaces of the magnetic elements are angled relative to the plane of the upper housing.

17. The angle measurement device of claim 16, wherein the radii defining the first and second surface sections of the upper housing are the same.

18. The angle measurement device of claim 17, wherein the radius defining the central surface section of the upper housing is greater than the radii defining the first and second surface sections.

19. The angle measurement device of claim 15, wherein the central surface section of the upper surface of the lower housing at least partially vertically aligns with the central surface section of the lower surface of the upper housing.

20. The angle measurement device of claim 15, wherein the upper housing includes a cavity therein; and further comprising electronic components in the cavity.

21. An angle measurement device for positioning electronic components on a cylindrical workpiece comprising:
  a lower housing having an upper surface and a lower surface, the upper surface having at least one curved surface section thereon configured to engage with the cylindrical workpiece;
  an upper housing pivotally coupled to the lower housing at a pivot, the upper housing having an upper surface and a lower surface, the lower surface of the upper housing facing the upper surface of the lower housing, the upper surface of the upper housing having at least one curved surface section thereon configured to engage with the cylindrical workpiece, and the lower surface of the upper housing having at least one curved surface section thereon configured to engage with the cylindrical workpiece;
  at least one magnetic element mounted to the upper surface of the upper housing; and
  a biasing member coupled to the upper and lower housings, the biasing member being configured to bias the upper and lower housings into a closed position.

* * * * *